(12) United States Patent
McKay et al.

(10) Patent No.: US 10,396,418 B2
(45) Date of Patent: Aug. 27, 2019

(54) ANAEROBIC ALUMINUM-WATER ELECTROCHEMICAL CELL

(71) Applicant: Massachusetts Institute of Technology, Cambridge, MA (US)

(72) Inventors: Ian Salmon McKay, Seattle, WA (US); Ruaridh R. Macdonald, London (GB); Thomas B. Milnes, Beverly, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/057,068

(22) Filed: Aug. 7, 2018

(65) Prior Publication Data

US 2019/0020083 A1    Jan. 17, 2019

Related U.S. Application Data

(63) Continuation-in-part of application No. 14/096,810, filed on Dec. 4, 2013.
(Continued)

(51) Int. Cl.
*H01M 12/08* (2006.01)
*C02F 1/469* (2006.01)
(Continued)

(52) U.S. Cl.
CPC .............. *H01M 12/08* (2013.01); *C02F 1/469* (2013.01); *H01M 2/0255* (2013.01); *H01M 2/14* (2013.01);
(Continued)

(58) Field of Classification Search
CPC ...... H01M 12/08; H01M 4/463; H01M 14/00; H01M 2004/027; H01M 2004/028;
(Continued)

(56) References Cited

U.S. PATENT DOCUMENTS 3,012,087 A    12/1961  Van Billiard et al.
3,368,958 A     2/1968  Pryor et al.
(Continued)

FOREIGN PATENT DOCUMENTS

WO    WO 92/05598    4/1992

OTHER PUBLICATIONS

Waszczuk, P. et al., "Surface Interaction of Benzoic Acid with a Copper Electrode", *Electrochimica Acta*, vol. 40, No. 11, 1995, pp. 1717-1721.
(Continued)

*Primary Examiner* — Lingwen R Zeng
(74) *Attorney, Agent, or Firm* — Sunstein Kann Murphy & Timbers LLP

(57) ABSTRACT

An electrochemical cell is provided. The cell includes: a plurality of electrode stacks, each electrode stack including an aluminum or aluminum alloy anode, and at least one cathode configured to be electrically coupled to the anode; one or more physical separators between each electrode stack adjacent to the cathode; a housing configured to hold the electrode stacks, an electrolyte, and the physical separators; a water injection port, in the housing, configured to introduce water into the housing. The aluminum or aluminum alloy of the anode is substantially free of titanium and boron.

18 Claims, 16 Drawing Sheets

Related U.S. Application Data

(60) Provisional application No. 61/733,002, filed on Dec. 4, 2012.

(51) Int. Cl.
  *H01M 4/46* (2006.01)
  *H01M 8/04828* (2016.01)
  *H01M 2/02* (2006.01)
  *H01M 2/14* (2006.01)
  *H01M 6/04* (2006.01)

(52) U.S. Cl.
  CPC ............ *H01M 4/463* (2013.01); *H01M 6/04* (2013.01); *H01M 8/04828* (2013.01); *H01M 2300/0014* (2013.01)

(58) Field of Classification Search
  CPC ... H01M 2300/0057; H01M 2300/006; H01M 2/14; H01M 8/04828; H01M 2300/0014; H01M 2/0255; H01M 6/04; Y02E 60/128; C02F 1/469
  See application file for complete search history.

(56) References Cited

U.S. PATENT DOCUMENTS

| | | | |
|---|---|---|---|
| 3,788,899 A | | 1/1974 | Zaromb et al. |
| 3,969,144 A | | 7/1976 | Zaromb et al. |
| 3,980,498 A | * | 9/1976 | Urbach .................. H01M 4/46 429/64 |
| 4,150,197 A | | 4/1979 | Zaromb |
| 4,254,190 A | | 3/1981 | Zaromb |
| 4,275,125 A | | 6/1981 | Struthers |
| 5,032,474 A | | 7/1991 | Hunter |
| 5,089,107 A | * | 2/1992 | Pacheco .................. C25B 5/00 204/230.2 |
| 5,376,471 A | * | 12/1994 | Hunter .................. H01M 2/38 429/405 |
| 5,462,821 A | | 10/1995 | Onoue et al. |
| 5,549,991 A | | 8/1996 | Licht et al. |
| 5,567,540 A | | 10/1996 | Stone et al. |
| 8,071,242 B2 | | 12/2011 | Rosenfeld et al. |
| 8,080,233 B2 | | 12/2011 | Woodall et al. |
| 2005/0031522 A1 | | 2/2005 | Delaney et al. |
| 2006/0019132 A1 | | 1/2006 | Lipilin et al. |
| 2007/0054155 A1 | | 3/2007 | Damery et al. |
| 2008/0063597 A1 | | 3/2008 | Woodall et al. |
| 2009/0104496 A1 | * | 4/2009 | Christensen ........ H01M 4/8605 429/408 |
| 2011/0177398 A1 | * | 7/2011 | Affinito ................. H01M 4/134 429/325 |
| 2011/0236765 A1 | | 9/2011 | Matsui et al. |
| 2012/0292200 A1 | | 11/2012 | Balagopal et al. |
| 2013/0276769 A1 | | 10/2013 | McKay et al. |
| 2015/0171469 A1 | | 6/2015 | Kourtakis et al. |
| 2015/0221956 A1 | | 8/2015 | McKay |

OTHER PUBLICATIONS

Egan, D.R. et al., "Developments in electrode materials and electrolytes for aluminium-air batteries," Journal of Power Sources, vol. 236, pp. 293-310, 2013.

Jung, Hyangmi et al., "Low fuel crossover anion exchange pore-filling membrane for solid-state alkaline fuel cells," Journal of Membrane Science, vol. 373, pp. 107-111, 2011.

Kobayshi, Yasukuyi et al., "Trivalent Al3+ Ion Conduction in Aluminum Tungstate Solid," Chem. Mater., vol. 9, pp. 1649-1654, 1997.

Li, Qingfeng et al., "Aluminum as anode for energy storage and conversion: a review," Journal of Power Sources, vol. 110, pp. 1-10, 2002.

MacDonald, D.D. et al., "Evaluation of Alloy Anodes for Aluminum-Air Batteries: Corrosion Studies," Corrosion Science, vol. 44, No. 9, pp. 652-657, Sep. 1988.

MacDonald, Digby et al., "Evaluation of Alloy Anodes for Aluminum-Air Batteries," Journal of the Electrochemical Society, vol. 135, No. 10, pp. 2397-2409, Oct. 1988.

Merle, Geraldine et al., "Anion exchange membranes for alkaline fuel cells: A review," Journal of Membrane Science, vol. 377, pp. 1-35, 2011.

Paramasivam, M. et al., "Influence of alloying additives on the performance of commercial grade aluminum as galvanic anode in alkaline zincate solution of use in primary alkaline batteries," Journal of Applied Electrochemistry, vol. 33, pp. 303-309, 2003.

Petrovic, John et al., "Reaction of Aluminum with Water to Produce Hydrogen," A Study of Issues Related to the Use of Aluminum for On-Board Vehicular Hydrogen Storage, U.S. Department of Energy, 27 pages, 2010.

Shayeb, H.A. El et al., "Effect of gallium ions on the electrochemical behaviour of Al, Al—Sn, Al—Zn and Al—Zn—Sn alloys in chloride solutions," Corrosion Science, vol. 43, pp. 643-654, 2001.

Shen, P.K. et al., "Development of an aluminium/sea water battery for sub-sea applications," Journal of Power Sources, vol. 47, pp. 119-127, 1994.

Zhang, Mingming et al., "New Electrolytes for Aluminum Production: Ionic Liquids," JOM, pp. 54-57, Nov. 2003.

Ziebarth, Jeffrey Thomas, "Use of the Al—Ga—In—Sn System for Energy Storage and Conversion," PhD Dissertation, Purdue University, 106 pages, May 2010.

European Patent Office, Communication Pursuant to Article 94(3) EPC; Application No. 13 876 444.4-1108, 5 pages, Jun. 25, 2018.

Kaminski Harmann Patentanwälte, Response to Office Action dated Jun. 24, 2016—European Application No. 13876444.4, dated Dec. 16, 2016, 12 pages.

European Patent Office, Office Action—European Application No. 13 876 444.4-1360, dated Mar. 22, 2017, 5 pages.

Kaminski Harmann Patentanwälte, Response to Office Action dated Mar. 27, 2017—European Application No. 13876444.4, dated Sep. 19, 2017, 14 pages.

European Patent Office, Office Action—European Application No. 13 876 444.4-1360, dated Dec. 4, 2017, 5 pages.

European Patent Office, Supplementary European Search Report—Application No. 13876444.4 dated Jun. 24, 2016, 8 pages.

International Searching Authority, International Search Report—International Application No. PCT/US2013/073044, together with the Written Opinion of the International Searching Authority, dated Aug. 15, 2014, 17 pages.

\* cited by examiner

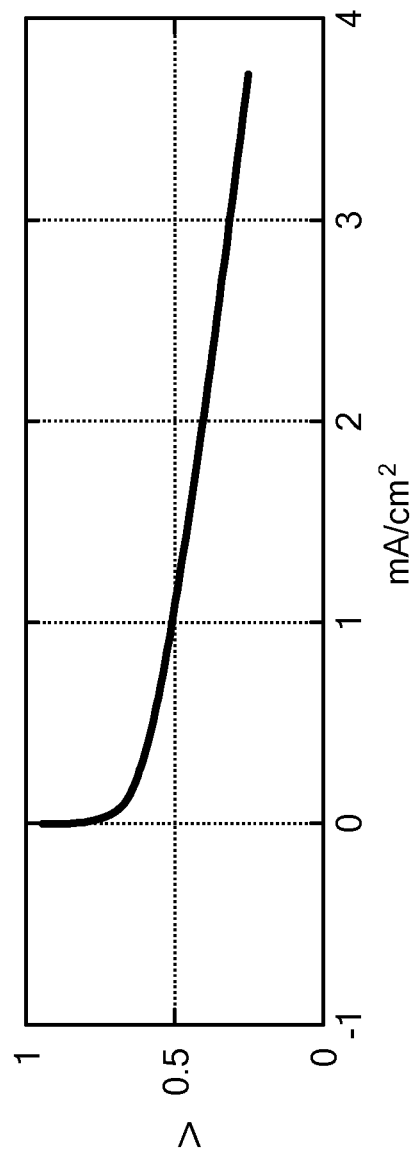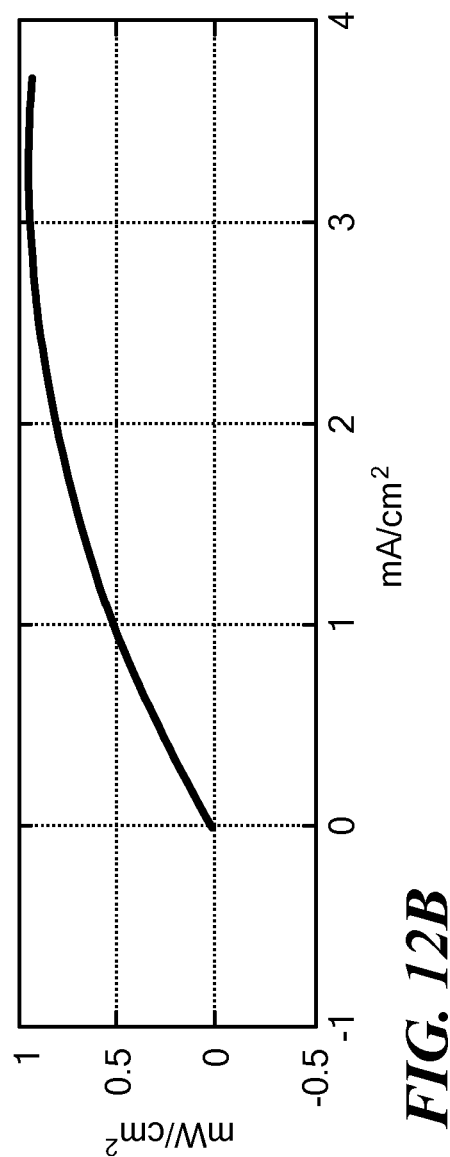
FIG. 12A
FIG. 12B

ANAEROBIC ALUMINUM-WATER ELECTROCHEMICAL CELL

CROSS-REFERENCE TO RELATED APPLICATIONS

This patent application is a continuation-in-part of U.S. patent application Ser. No. 14/096,810 filed Dec. 4, 2013 and claiming the benefit of U.S. Provisional Patent Application No. 61/733,002 filed Dec. 4, 2012. The disclosures of these applications are incorporated by reference herein in their entirety.

STATEMENT REGARDING FEDERALLY SPONSORED RESEARCH OR DEVELOPMENT

This invention was made with government support under Contract No. FA8721-05-C-0002 awarded by the U.S. Air Force. The U.S. government has certain rights in the invention.

TECHNICAL FIELD

The present invention relates to electrochemical cells for use in dynamic storage of energy, and more particularly, to anaerobic aluminum-water electrochemical cells.

BACKGROUND ART

Aluminum metal is an energy-dense (e.g., greater than 80 MJ/L) fuel with the potential to enhance a variety of common systems. Because aluminum can oxidize in water, it is especially promising as a power source for undersea devices, which are severely limited by the low energy density of conventional anaerobic energy storage media (e.g., less than 1 MJ/L for Li-ion batteries). However, while recent advancements in the scalable de-passivation of aluminum have eliminated some barriers to effective energy storage in aluminum, efficient energy conversion from the heat of reaction $2Al+6H_2O \rightarrow 3H_2+2Al(OH)_3+Q$ remains elusive. This difficulty is mainly attributable to the slow kinetics of the reaction, which are not conducive to maintenance of the steep temperature gradient required for efficient thermal energy conversion. In electrochemical Al-based devices, the continuous loss of some of the aluminum anode due to parasitic corrosion reduces the energy density of the cell and shortens the self-discharge time of the system. Thus, previous attempts to commercialize Al-air and Al-water fuel cells have failed, largely due to the high anodic overpotentials and parasitic anodic corrosion that reduces discharge efficiencies to ~10-50 percent.

SUMMARY OF EMBODIMENTS

In accordance with a first set of embodiments of the invention, there is provided an anaerobic aluminum-water electrochemical cell. The electrochemical cell includes: a plurality of electrode stacks, each electrode stack including an aluminum or aluminum alloy anode, and at least one cathode configured to be electrically coupled to the anode; one or more physical separators between each electrode stack adjacent to the cathode; a housing configured to hold the electrode stacks, an electrolyte, and the physical separators; a water injection port, in the housing, configured to introduce water into the housing. The aluminum or aluminum alloy of the anode is substantially free of titanium and boron.

In accordance with a second set of embodiments of the invention, there is provided an aluminum-water electrochemical system including: an anaerobic aluminum-water electrochemical cell, a waste separation system, and a fuel injector. The electrochemical cell includes: a plurality of electrode stacks, each electrode stack including an aluminum or aluminum alloy anode, and at least one cathode configured to be electrically coupled to the anode; one or more physical separators between each electrode stack adjacent to the cathode; a housing configured to hold the electrode stacks, an electrolyte, and the physical separators; a water injection port, in the housing, configured to introduce water into the housing, wherein the aluminum or aluminum alloy of the anode is substantially free of titanium and boron. The waste separation system is in fluid communication with the housing and is configured to receive electrolyte and aluminum hydroxide waste from the aluminum-water electrochemical cell and to separate the aluminum hydroxide waste from the electrolyte. The fuel injector is in fluid communication with the waste separation system and the water injection port and is configured to receive the electrolyte from the waste separation system and to provide the electrolyte to the water injection port.

In accordance with a third set of embodiments of the invention, there is provided a method for generating an electrical current. The method includes: introducing water between an anode and at least one cathode of an electrochemical cell, to form an electrolyte; anaerobically oxidizing aluminum or an aluminum alloy; and electrochemically reducing water at the at least one cathode. The electrochemical cell includes: a plurality of electrode stacks, each electrode stack including an aluminum or aluminum alloy anode, and at least one cathode configured to be electrically coupled to the anode; one or more physical separators between each electrode stack adjacent to the cathode; a housing configured to hold the electrode stacks, the electrolyte, and the physical separators; and a water injection port, in the housing, configured to introduce water into the housing. The aluminum or aluminum alloy of the anode is substantially free of titanium and boron.

BRIEF DESCRIPTION OF THE DRAWINGS

The foregoing features of the invention will be more readily understood by reference to the following detailed description, taken with reference to the accompanying drawings, in which:

FIGS. 12A and 12B show performance curves for the cell shown in FIG. 6 according to embodiments of the present invention.

DETAILED DESCRIPTION OF ILLUSTRATIVE EMBODIMENTS

Embodiments of the present invention provide an anaerobic aluminum-water electrochemical cell that harvests energy from the oxidation of aluminum metal in an aqueous electrolyte or a non-aqueous electrolyte having a small amount of water. Aluminum reacts with the water at the anode-electrolyte interface, and hydrogen gas is produced at the cathode. As the cell is anaerobic, it does not contain molecular oxygen ($O_2$) in amounts that might significantly compete with the water for reaction with the anodic aluminum. The electrolyte may contain minor amounts of molecular oxygen dissolved therein, though preferably at concentrations of less than 15 mg/L and above 0.001 mg/L. In some embodiments, the concentration of molecular oxygen in the electrolyte can fall to levels below 1 mg/L and above 0.01 mg/L, especially but not only when the cell is in operation.

Using catalytic effects to separate the half-cell reactions, embodiments of the present invention demonstrate energy densities of about 3.7-20 MJ/L, up to 25 times the effective energy density of conventional anaerobic energy storage media, e.g., Li-ion batteries, the current state of the art in underwater power sources, albeit with some power limitations. Details of illustrative embodiments are discussed below.

Figure 1:
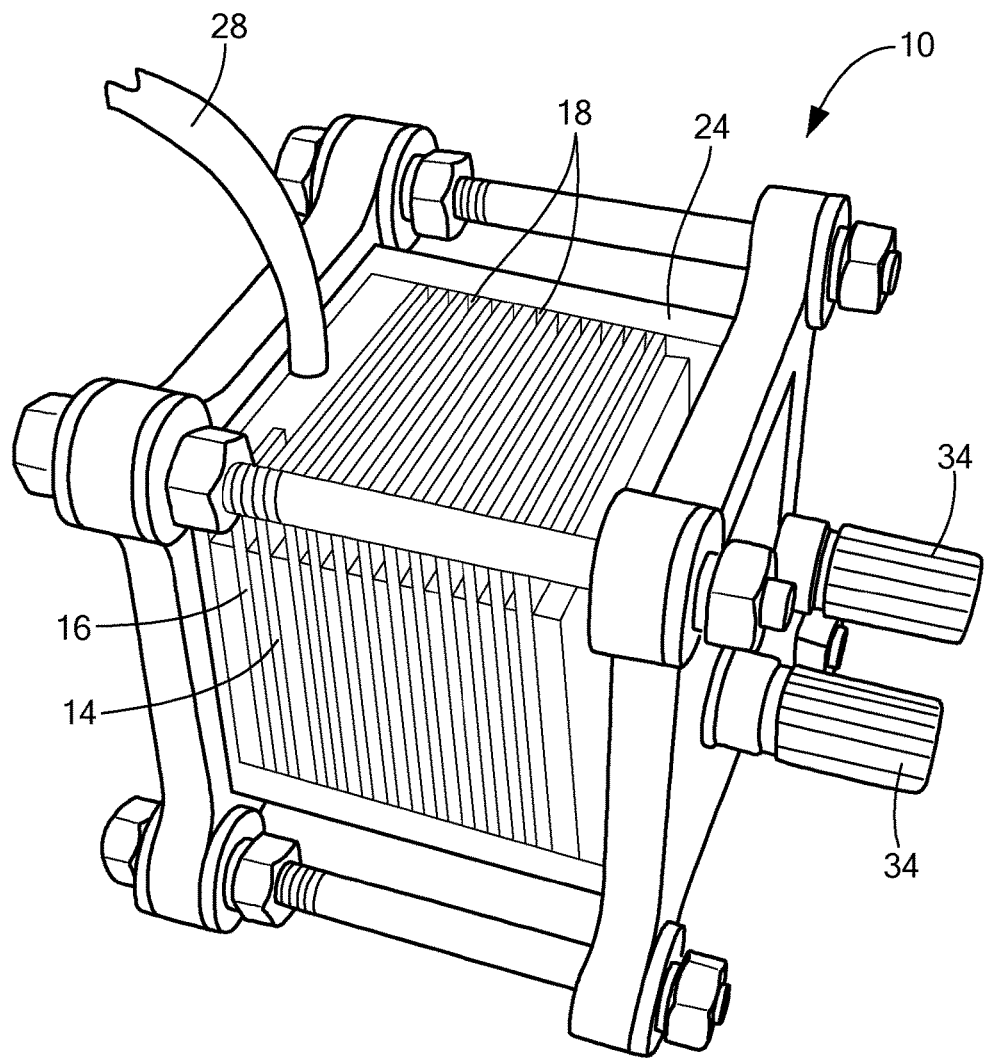
FIG. 1 shows an anaerobic aluminum-water electrochemical cell according to embodiments of the present invention.
Figure 2:
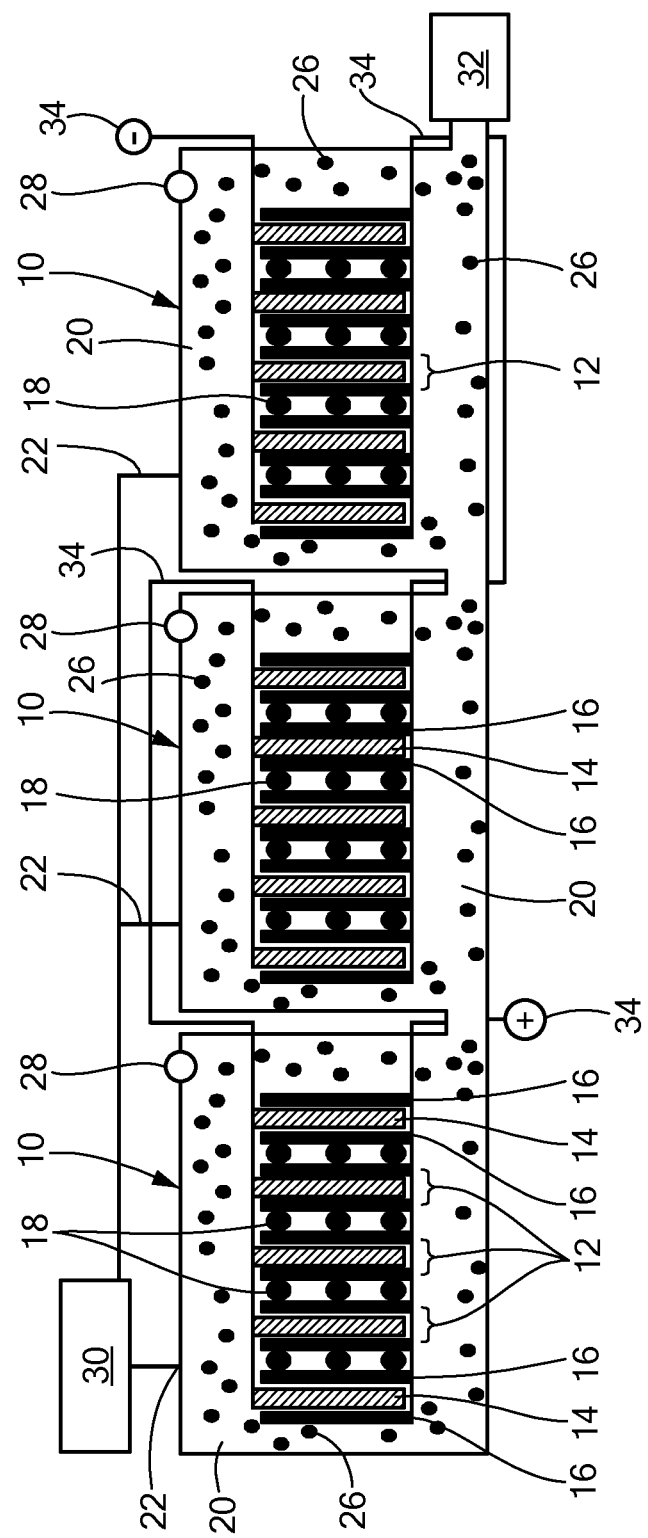
FIG. 2 schematically shows a series of anaerobic aluminum-water electrochemical cells in a multi-cell configuration according to embodiments of the present invention.
Figure 5:
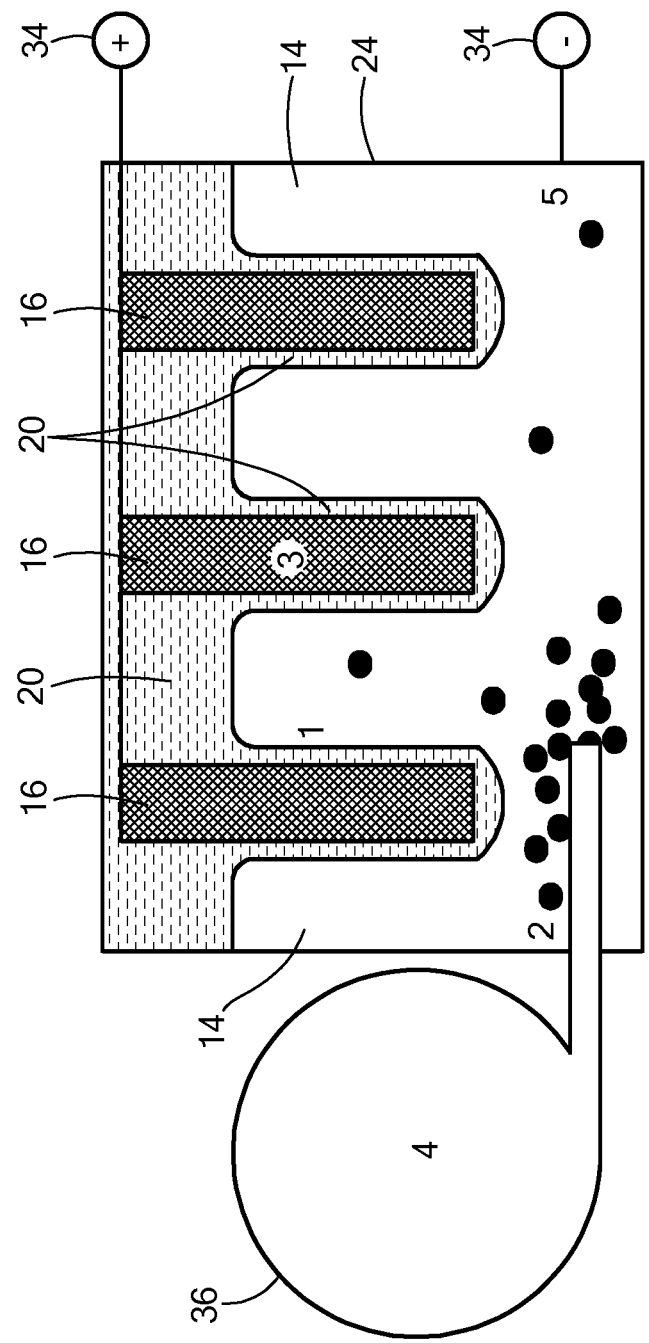
FIG. 5 schematically shows an aluminum-water electrochemical cell configuration with a liquid anode and a vertical stack of cathodes according to embodiments of the present invention.

FIG. 1 shows an anaerobic aluminum-water electrochemical cell 10, and FIG. 2 schematically shows a series of anaerobic aluminum-water electrochemical cells 10 in a multi-cell configuration according to embodiments of the present invention. As used herein, the term electrochemical cell may encompass an individual electrochemical cell or cell unit, such as shown in FIG. 1, as well as configurations having an array of electrochemical cells, such as shown in FIG. 2. Referring to FIGS. 1 and 2, the electrochemical cell 10 includes a number of interdigitated electrode stacks 12 of thin anodes 14 and cathodes 16 separated by one or more physical separators 18. The anode 14 includes an aluminum or an aluminum alloy and may be in a solid phase (as shown in FIGS. 1 and 2), e.g., formed into a plate, or a liquid phase (as shown in FIG. 5 and discussed in more detail below). The electrode stack 12 may include two cathodes plates 16 on either side of an anode plate 14, such as shown in FIG. 2, although any number of cathode plates may be used within each stack. In addition, any number of stacks 12 may be used within the electrochemical cell 10 depending on the application and desired size. The stacks 12 can be parallel to one another (as shown in FIGS. 1 and 2) perpendicular to one another (not shown), or a combination of both configurations. The anodes 14 and cathodes 16 are electrically connected by leads 34 through which electrons may pass to an external source or sink (not shown).

The electrochemical cell 10 also includes an electrolyte 20, e.g., a basic or acidic aqueous media or non-aqueous, water miscible media, disposed between the anodes 14 and cathodes 16, and a housing 24 configured to hold the electrode stacks 12, the physical separators 18, and the electrolyte 20. In some embodiments, the electrolyte 20 may be provided already inside the cell. In another set of embodiments, the cell 10 is kept dry until such time as established by the user, thereby minimizing corrosion reactions that might occur if the cell 10 was stored with the electrolyte 20 in physical contact with the electrodes. Then, when a source of electric power is needed, the electrolyte 20 is introduced between the anode 14 and cathodes 16, for example by flooding the cell with pre-mixed electrolyte or by introducing the ingredients of the electrolyte 20 in the cell, and an electrical circuit is established between the leads 34. In some instances, the electrochemical cell 10 is provided with the ingredients of the electrolyte 20 minus the solvent, which is added when the electrochemical cell 10 is activated. In one exemplary method, water either pure or in the form of an aqueous solution such as seawater is introduced into the housing 24 through injection port 22, forming electrolyte 20 by mixing with the other ingredients either prior to or after entering the housing 24.

Figure 3A:
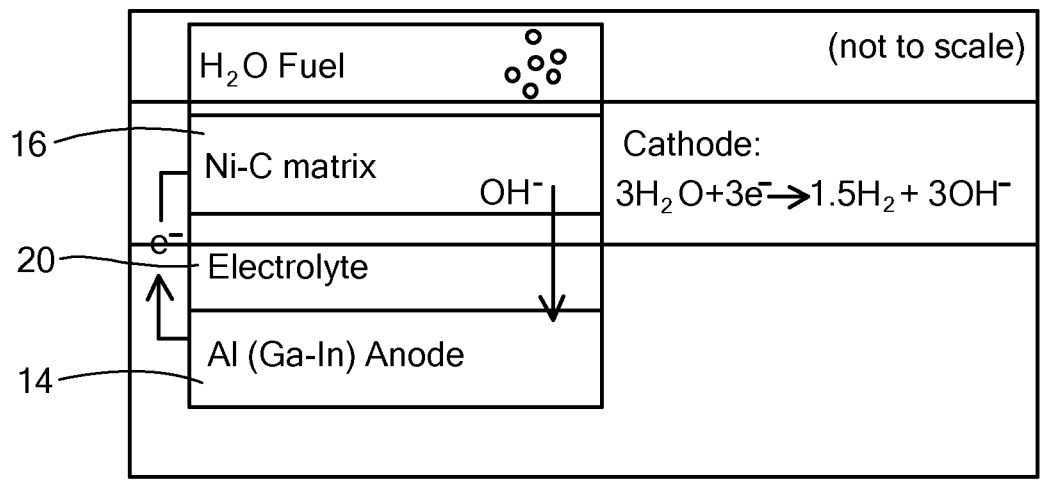
FIGS. 3A-3C schematically show one electrode stack in an aluminum-water electrochemical cell configuration according to embodiments of the present invention.
Figure 3B:
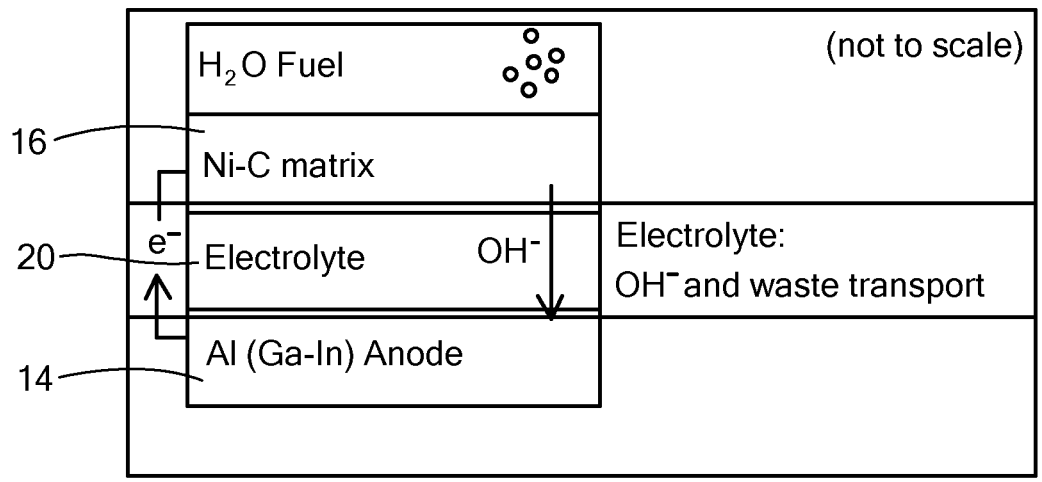
Figure 3C:
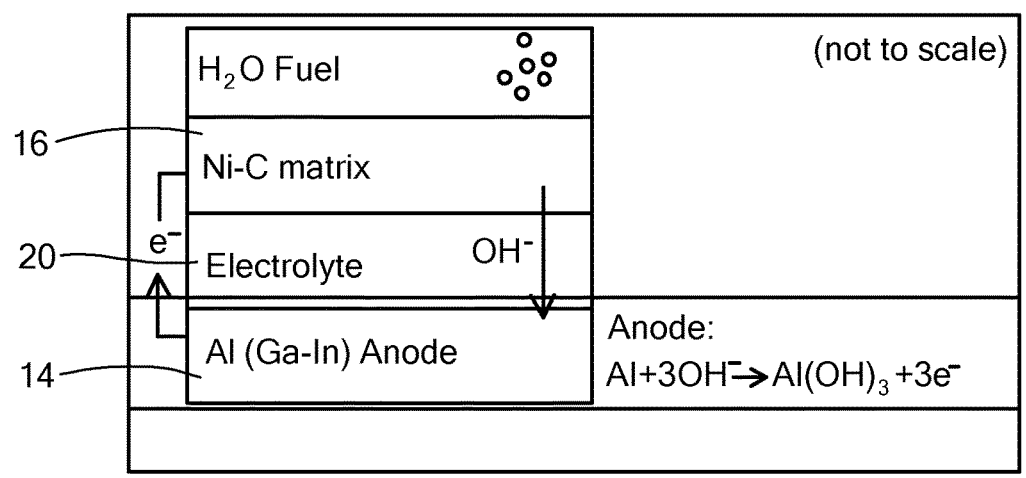

The housing 24 may be made from any electrically insulating, non-reactive material, such as a plastic material (e.g., high-density polyethylene (HDPE), low-density polyethylene (LDPE), polypropylene (PP), or acrylonitrile butadiene styrene (ABS)), that is corrosion-resistant to the electrolyte 20 and the two electrode 14 and 16 materials. In particular, it has been found that the housing 24 can be easily manufactured by ultrasonically welding panels of ABS. The housing 24 includes one or more water injection ports 22 configured to introduce water, either pure or as part of an aqueous solution, into the housing 24. Preferably, the water is injected into the electrolyte 20 close to the cathode 16 and away from the anode 14. For example, the water injection ports 22 may be configured to introduce the water into the housing 24 so that the water flows through the physical separators 18 next to the cathodes 16. This configuration increases the concentration of water near the cathode 16, increasing the rate at which water is split into $H^+$ and $OH^-$, and decreases the concentration of water at the anode 14, minimizing the parasitic corrosion reaction. In embodiments of the present invention, the electrochemical cell 10 undergoes two primary reactions, as shown in FIGS. 3A through 3C:

$$3H_2O + 3e^- \rightarrow 1.5H_2 + 3OH^- \text{(cathode)} \quad 1)$$

$$Al + 3OH^- \rightarrow Al(OH)_3 + 3e^- \text{(anode)} \quad 2)$$

yielding a total reaction of: $Al + 3H_2O \rightarrow 1.5H_2 + Al(OH)_3$

Referring again to FIG. 2, the water injection ports 22 are in fluid communication with a water supply 30. The water supply 30 may be an internal tank that stores water or may be an external supply drawn from outside the electrochemical cell 10, such as seawater. The housing 24 also includes one or more hydrogen release valves 28 configured to allow the hydrogen generated at the cathode 16 to be released from the electrochemical cell 10. Aluminum hydroxide waste 26 forms on the aluminum anode 14 when the aluminum reacts with the hydroxide ions. The aluminum hydroxide waste 26 can reduce the performance of the fuel cell 10. To reduce this effect, the hydrogen flow from the cathodes 16 may be channeled over the anodes 14, carrying the waste away from the anode surface and into the electrolyte 20. The waste 26 may be removed from the electrolyte 20 using filters and similar technologies or may be allowed to build up in the electrolyte 20. If waste removal is desired, the individual cells 10 may each have a separate waste removal system or may have a shared waste removal system 32. For example, the waste 26 may be carried over and around the cells by the flow of hydrogen before settling to the bottom of the housing 24, where it may be removed or become trapped in a low-conductivity water immiscible fluid, such as mineral oil. The waste 26 or the fluid with the waste may be pumped out to a shared waste filter/ejection system 32 (such as described in more detail below in FIG. 6). If the waste 26 is allowed to build up in the electrolyte 20 or some electrolyte 20 is lost during operation, the electrolyte 26, or some portion thereof, may be replaced periodically.

As mentioned above, the electrolyte 20 may include basic or acidic aqueous media or non-aqueous, water miscible media. For example, seawater or water, alkaline KOH or NaOH solution, acidic HCl or $H_2SO_4$ solution, or alkaline ionic liquid or primary alcohol (e.g., methanol or ethanol) solutions, and mixtures thereof, may be used as the electrolyte 20. The goal of the electrolyte 20 is to allow the transport of hydroxide ions without allowing water to react directly with the aluminum fuel in the anode 14. Thus, further additions may be made to the electrolyte 20 to increase the power output and reduce the corrosion rate of the cell 10. For example, a surfactant, e.g., Triton X, or sodium dodecyl sulfate, may be added to increase the rate at which hydrogen bubbles are shed from the surface of the electrodes 14, 16, ensuring that most or all of the surface area remains available to reactants and reduces bubble-overpotential caused by the drop in ion concentration in a region filled with bubbles. In addition, the surfactant reduces the size of the bubbles that are formed, which allows the electrodes 14, 16 to be kept closer to one another. To reduce corrosion, inert compounds, such as ionic liquids (e.g., 1-ethyl-3-methylimidazolium hydroxide and 1-butyl-3-methyl imidazolium tetraflouroborate) may be added to the electrolyte 20 to decrease the water activity of water molecules in the solution. This reduction in mobility helps trap the water molecules near the cathode 16, further reducing the water concentration near the anode 14 which causes parasitic corrosion. Other liquids, such as primary alcohols (e.g., 60% methanol), secondary alcohols (e.g., 2-propanol), acetonitrile (e.g., 30% ACN), dimethyl carbonate, and dimethyl sulfoxide may also be added to the electrolyte in order to promote good OH– ion (anion) conductivity. The anion conductivity can be increased by dissolving a base, such as KOH, into the electrolyte 20. The ionic liquids, surfactant, and other liquids may be added in varying amounts to the electrolyte 20, e.g., from about 5-95 vol % of the total electrolyte.

In some embodiments, the electrolyte 20 is a solution of aqueous or water-miscible media containing a hydroxide base. It has been found that, in certain instances, the presence of a hydroxide base improves the performance of the cell 10. Without being bound to any particular theory, it is believed that increasing the concentration of the OH– (hydroxide) ion in the electrolyte 20 facilitates the transport of hydroxide ions from the cathode to the anode 14 and the removal of spent reactants while preventing or reducing reaction of water directly with the aluminum fuel in the anode 14, thereby increasing the power output and reducing the corrosion rate of the cell 10. Example hydroxide bases are provided by alkali metal bases, such as NaOH and KOH, alkaline earth metal bases, such as $Ca(OH)_2$ and $Mg(OH)_2$, and combinations thereof. Hydroxide bases may also be generated in situ by mixing an aqueous solution with one or more strong bases, for example MeONa, EtONa, n-BuLi, LDA, LDEA, $NaNH_2$, NaH, $((CH_3)_3Si)_2NLi$. The strong base reacts completely with water, yielding hydroxide anion ($OH^-$) and substantially none of the original anion remains after the strong base is added to the solution. Unless otherwise noted, the term "a hydroxide base" is intended to cover one or a combination of two or more hydroxide bases, depending on the context.

In a number of representative embodiments, the cell 10 includes an amount of hydroxide base sufficient to form an electrolyte 20 having a hydroxide base concentration of at least 0.5% to at most 13% of the saturation concentration when a solvent, for example water, is introduced between the anode 14 and the least one cathode 16, where the saturation concentration is herein intended as measured at room temperature. Preferably, the amount of hydroxide base is sufficient to form an electrolyte 20 having a hydroxide base concentration of at least 1% to at most 12% of the saturation concentration. More preferably, the amount of hydroxide base is sufficient to form an electrolyte 20 having a hydroxide base concentration of at least 1.5% to at most 10% of the saturation concentration, and yet more preferably the amount of hydroxide base is sufficient to form an electrolyte 20 having a hydroxide base concentration of at least 7% to at most 13% of the saturation concentration. The hydroxide base may be already pre-mixed with the other ingredients of the electrolyte 20 or instead combined with such ingredients at the time the cell 10 is activated.

In another set of representative embodiments, the electrolyte 20 contains a hydroxide base at a concentration of at least 0.05 M and at most 3 M. In a third set of representative embodiments, the hydroxide base concentration is from at least 0.1 M to at most 2.5 M. In a further set of representative embodiments, the hydroxide base concentration is from at least 0.25 M to at most 2 M. In additional embodiments, the electrolyte 20 includes a hydroxide base at a concentration from at least 0.5 M to at most 1.5 M, and, in further embodiments, the hydroxide base concentration is from at least 0.5 M to at most 1 M. The ingredients of the electrolyte 20 may be pre-mixed or instead combined at the time the cell 10 is activated.

When the cell 10 is in operation, that is, generating an electric current, it is preferred that there be substantially no homogeneous precipitation of aluminum hydroxide waste 26 because it tends to form precipitate everywhere in the electrolyte 20 and therefore fouls the anode and cathode surfaces, clogs tubes, and jams the pumps of electrolyte circulation systems. It has been found that homogeneous precipitation can be minimized if the concentration of aluminum species in the electrolyte 20 is maintained between at least 0.01 M to at most 0.7 M, where the term "aluminum species in the electrolyte" refers to aluminum-bearing species dissolved in the electrolyte 20, including but not limited to aluminum hydroxide ($Al(OH)_3$), hydroxyaluminate anion ($Al(OH)_4^-$), and oxyanions of aluminum such as $AlO_2^-$. Preferably, the concentration of aluminum species in the electrolyte 20 is maintained between at least 0.1 M to at most 0.6 M. More preferably, the concentration of aluminum species in the electrolyte 20 is maintained between at least 0.2 M to at most 0.5 M.

The volume of the electrolyte 20 in the electrochemical cell 10 should be kept roughly constant to ensure that the electrodes 14, 16 remain covered. If the electrolyte 20 is volatile, hydrogen may be allowed to build up at the top of the chamber 24, increasing the pressure and reducing electrolyte evaporation. If the electrolyte 20 is lost to side reactions or as part of the process of removing waste 26, a supplementary tank of electrolyte 20 may be used to ensure that the volume is maintained and the housing 24 remains filled. The water content of the electrolyte 20 directly controls the power output of the fuel cell 10. Therefore, the power may be increased or decreased depending on the water injection rate.

Figure 4A:
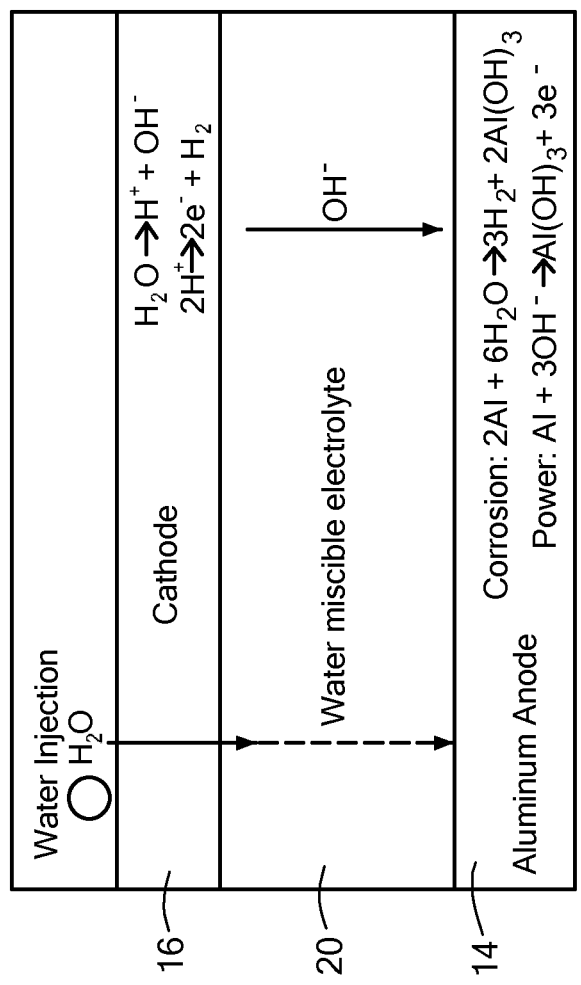
FIG. 4A schematically shows one electrode stack in an aluminum-water electrochemical cell configuration with a water miscible electrolyte, and FIG. 4B schematically shows a comparison of anion and water concentrations over the length of the stack in FIG. 4A according to embodiments of the present invention.
Figure 4B:
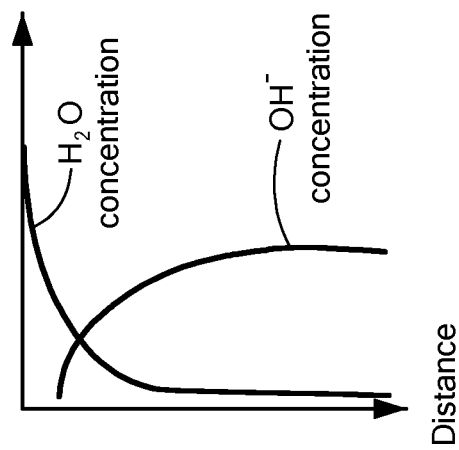

FIG. 4A schematically shows an electrochemical cell 10 configuration with a water miscible electrolyte 20. In this embodiment, the electrolyte 20 is a non-aqueous, water miscible material with good OH– ion (anion) conductivity. For example, ionic liquids and light alcohols, such as methanol, may be used. As shown, water may be gradually injected into the electrolyte 20, preferably near the cathode 16. The non-aqueous, water miscible electrolyte may have about 90 wt % of water or less. In addition, the water or the electrolyte 20 may have one or more of the additives mentioned above, e.g., ions dissolved in it, to promote ion conductivity, adjust power output, and reduce the corrosion rate of the fuel cell. Due to the low water content of the electrolyte 20, parasitic corrosion of the aluminum or aluminum alloy anode 14 is significantly reduced since the concentration of water at the anode 14 is reduced (as shown in FIG. 4B), making the half-cell reactions much more favorable over the parasitic reaction.

As mentioned above, the anode 14 material includes an aluminum or aluminum alloy that may be in a solid phase or a liquid phase. When in the solid phase, the aluminum or aluminum alloy anode 14 may be in the form of a thin plate, as shown in FIGS. 1 and 2. The thickness of the anode 14 may vary depending on the power or energy density requirements, e.g., for higher power density, a thinner anode may be used and for higher energy density the mass of the anode may be increased. Preferably, the anode thickness may be about 1-3 mm. Any purity of aluminum may be used, but it has been found that aluminum having a purity of at least 99.95 wt % can improve the coulombic efficiency of the cell. Thus, high purity aluminums, for example "4N aluminum" having a purity of 99.99 wt %, and "5N aluminum" having a purity of 99.999 wt % are particularly advantageous in a number of embodiments.

In some embodiments, the anode 14 is substantially free of certain impurities, such as iron and copper, which may decrease the energy density of the fuel cell by increasing the rate of parasitic corrosion. In certain embodiments, the anode 14 is substantially free of titanium and boron as the presence of those elements in an anodic aluminum alloy has been found to provide no benefit and detrimental in some cases. As used in this description and the accompanying claims, the term "substantially free" of a given component shall have the meaning of the component being present in an amount less than 1 ppm, unless the context otherwise requires.

The goal of the anode 14 is to avoid passivation with both $Al_2O_3$ and $Al(OH)_3$ as well as hinder the $H_2$ evolution reaction. Alloying the aluminum with a metal with a high hydrogen overpotential and a higher nobility than aluminum in the electrochemical series (e.g., indium) reduces the corrosion of the aluminum metal and may increase the discharge potential. Alloying the aluminum with a metal that disrupts the alumina passivation layer which covers the anode 14 (e.g., gallium) increases the current density. Combinations of metals can be alloyed with aluminum to achieve a mixture of effects, e.g., Al or Al alloy with Ga, In, Sn, and/or Mg. Preferably, the anode 14 is made of an aluminum alloy with about 0.1 wt % of In and 0.1 wt % of Ga. In embodiments using a solid anode, the electrochemical cell 10 is mechanically recharged by replacing the solid aluminum or aluminum alloy anodes 14.

When in the liquid phase, the anode 14 material may be comprised of a liquid metal alloy that includes aluminum. The liquid metal (e.g., an alloy comprised of Ga, In, Sn, and/or Mg) is not consumed in the anode-side reaction. Rather, the liquid metal merely facilitates the passage of aluminum fuel to the anode-electrolyte interface. For example, the liquid material may be about 100 wt % gallium or may be about 65-70% wt % Ga, 20-25% wt % In, and 5-15 wt % Sn. Advantages of this embodiment over solid-anode technology are that it provides a higher standard cell potential vs. both oxygen reduction and hydrogen evolution electrodes and a significantly slower rate of anodic corrosion relative to the rate of galvanic discharge. The oxidation of aluminum in the electrochemical cell 10 can proceed through either the electrochemical pathway described above and shown in FIGS. 3A through 3C, or through the corrosion reaction $2Al+6H_2O \rightarrow 3H_2+2Al(OH)_3$ occurring entirely on the anode 14. In addition to the depassivation effect mentioned above, the liquid anode 14 may be preferable to a solid aluminum or aluminum-alloy anode 14 because the liquid anode 14 configuration retards this corrosion reaction. This effect may be attributable to the low surface activity of liquid metal surfaces, in particular the alloys of Ga, In, and Sn, for the hydrogen evolution reaction in both basic and acidic aqueous and non-aqueous media. In addition, the liquid phase anode 14 may increase the open-circuit potential of the anode 14 relative to the cathode 16 or hydrogen electrode. Whereas solid Al alloys typically passivate with a thick $Al(OH)_3$ gel or layer during anodic polarization, convection on the liquid metal anode surface reduces this effect, and open circuit potentials up to −1.55V vs. $H_2$—$H_2O$ may be observed.

As shown in FIG. 5, a solid aluminum or an aluminum alloy material 36 may be fed into the liquid material via an in-situ interdiffusion process, such as described in U.S. Patent Application Publication No. 2013/0276769, incorporated by reference herein in its entirety. Preferably, the rate of reaction at the liquid anode-water interface (point 1 in FIG. 5) is equal to the rate of diffusion of solid fuel material 36 into the liquid anode 14 at the fuel feed (point 2 in FIG. 5). A high surface-area cathode material 16, such as Pt-loaded carbon paper, felt, cloth, or mesh (as will be described in more detail below), is separated from the liquid anode material 14 by the surface properties of the electrolyte 20 and liquid metal anode 14. In this case, additional physical separators 18 do not need to be included, although they may be used. The stack of cathodes 16 may be arranged in a vertical direction so that one end of each cathode is surrounded by the liquid anode 14. The fuel supply material 36 may be any arbitrary size relative to the reactor vessel 24 and may consist of pure aluminum or an aluminum alloy with In, Mg, Sn, and/or Ga. For example, the aluminum alloy may be aluminum with about 0.1 wt % of In and 0.1 wt % of Ga. The solid aluminum or aluminum alloy material 36 may be introduced into the liquid anode material as a wire, foil, block, pellets, or a combination thereof. In addition, an additive may be added to the liquid material in order to facilitate the dissolution of the aluminum or the aluminum alloy in the liquid. The electrical lead 34 to the anode (point 5 in FIG. 5) may be made with any electrically conductive material, such as a small diameter wire or razor blade, preferably composed of a material such as tungsten which easily wets to the liquid metal alloys in the anode 14.

Whether using a solid or liquid anode 14, the cathode 16 may be made of any material with a low hydrogen overpotential which is chemically stable in the chosen electrolyte 20. For example, nickel and platinum both have low hydrogen overpotentials, although platinum is not stable in methanol. In addition, the cathode 16 preferably has a high surface area to decrease the current density on its surface and reduce overpotential losses. This may be achieved by selecting materials with highly engineered surfaces, such as carbon paper, felt, cloth, or mesh material, and then depositing Ni or Pt on its surface. For example, the cathode 16 may be Pt coated carbon or titanium or a NiC matrix material. The cathode 16 may be in the form of a thin plate that is spaced apart from the anode 14. The thickness of the cathode 16 may vary depending on the power or energy density requirements, and one or more cathodes 16 may be used in the electrode stack. Preferably, the cathode thickness may be about 40-100 µm. Additional anion permeable polymer layers, such as nafion or anion exchange membranes, may be added to the cathode 16 if ions in the electrolyte 20 tend to deposit on and contaminate the cathode 16.

It has also been found that the electrochemical roughness factor of the cathode 16 can influence the performance of the cell 10. The electrochemical roughness factor of a material is determined by measuring its effective double layer capacitance and comparing it to that of an electropolished flat foil of the same material. (See Waszczuk, P., Zelenay, P. & Sobkowski, J. Surface interaction of benzoic-acid with a copper electrode. Electrochim. Acta 40, 1717-1721 (1995)). Preferably, at least one cathode 16 has a surface characterized by an electrochemical roughness factor of at least 5. More preferably, the electrochemical roughness factor of the cathode surface is at least 10, and most preferably at least 15. While there is no preferred upper limit to the electrochemical roughness factor of the cathode, an acceptable upper boundary may be set at 25, 40, or 50.

The mean pore diameter of the cathode surface has also been discovered to influence the performance of the cell 10. Preferably, at least one cathode 16 has a surface characterized by a mean pore diameter of at most 50 µm. More preferably, the mean pore diameter of the surface is at most 100 µm. While there is no preferred lower limit to the mean pore diameter, an acceptable lower boundary may be set at 5 µm, 10 µm, or 25 µm.

In a further discovery, it has been found that higher voltages can be achieved when the concentration of hydroxyaluminate (Al(OH)4?) in the electrolyte 20 first grows to reach a maximum, then drops to a minimum. Preferred maxima and minima vary with factors associated with the operating conditions of the cell such as the composition of the electrolyte 20 and the power draw rate. Usually, a higher electrolyte pH is accompanied by a higher preferred hydroxyaluminate concentration maximum, and vice versa, while higher power output rates are associated with higher minima. In representative embodiments, and depending on the operating conditions, the maximum may fall within a range from at least 125% of the saturation concentration to at most one of 150%, 175%, 200%, 225%, 250%, 500%, 750%, 1000%, 1500%, or even 2000% of the saturation concentration. The minimum may vary between at most 250% of the saturation concentration to at most one of 225%, 200%, 175%, 150%, 125%, 100%, 75%, 50% or even 30% of the saturation concentration.

In some instances, better performance is obtained when the hydroxyaluminate concentration of the electrolyte 20 is kept within certain ranges when the cell is in operation. In an exemplary set of embodiments, the hydroxyaluminate concentration of the electrolyte 20 is maintained between at least 20% to at most 750% of the saturation concentration. Preferably, the electrolyte hydroxyaluminate concentration is maintained between at least 30% to at most 500% of the saturation concentration. More preferably, the electrolyte hydroxyaluminate concentration is maintained between at least 50% to at most 250% of the saturation concentration. Most preferably, the electrolyte hydoxyaluminate concentration is maintained between at least 50% to at most 150% of the saturation concentration.

The one or more physical separators 18 may be made of any material with a relatively high electrical resistivity which is chemically stable in the chosen electrolyte 20, such as a plastic material (e.g., HDPE or LDPE). For example, the electrical resistivity may be greater than about $10^8$ ohms·cm. In addition, the physical separator 18 preferably has a high areal density (e.g., mostly open area), so that the water may be introduced and allowed to flow through the physical separator 18. For example, the physical separator 18 may be made with a mesh material having about 95% or greater areal density (e.g., thin strands of a polymer material), preferably having openings of about 100 µm or larger. In addition, the physical separator 18 may be in the form of a thin plate disposed adjacent to the cathode 16. The thickness of the physical separator 18 may vary, but is preferably about 200 µm or less.

Figure 6:
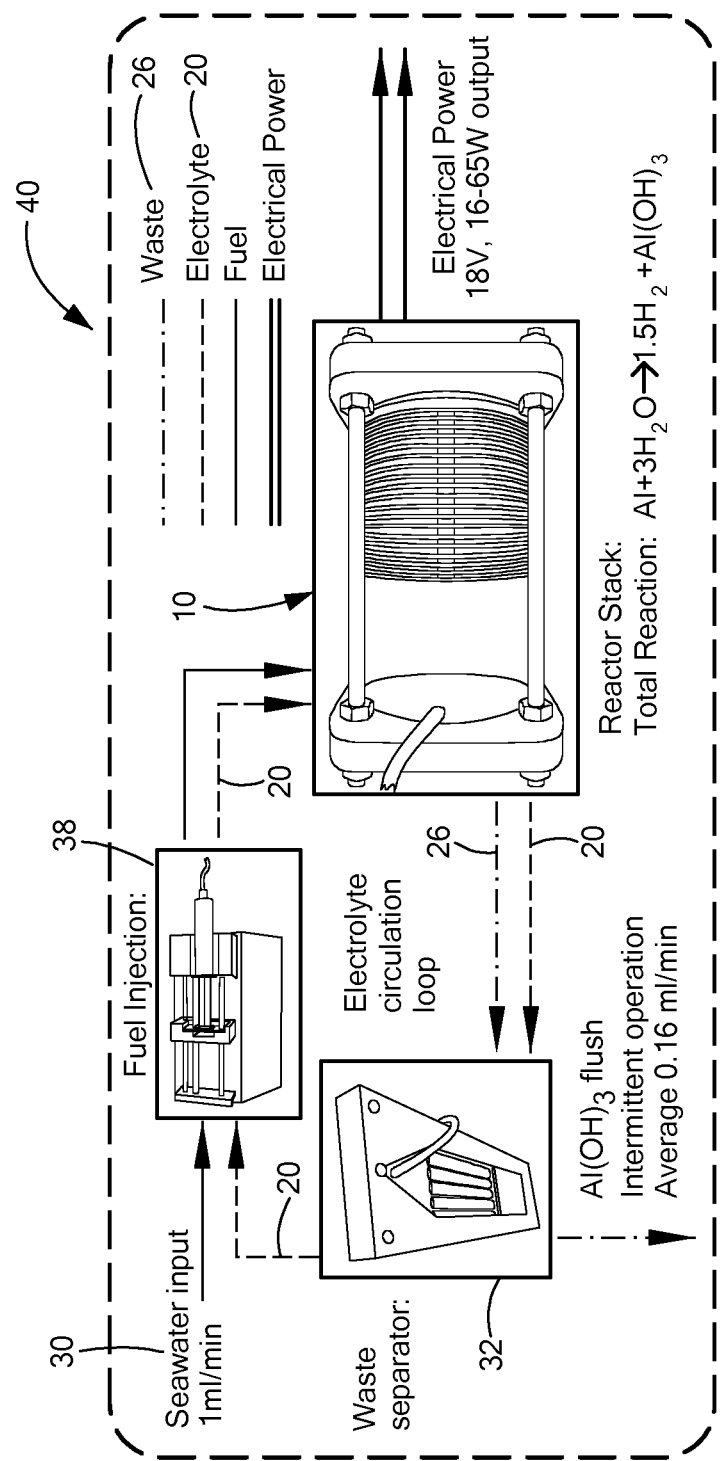
FIG. 6 schematically shows an aluminum-water electrochemical cell system according to embodiments of the present invention.

FIG. 6 schematically shows an aluminum-water electrochemical system 40 that uses the electrochemical cell 10 according to embodiments of the present invention. The system 40 includes the electrochemical cell 10, a waste separation system 32 in fluid communication with the electrochemical cell 10, and a fuel injector 38 in fluid communication with the waste separation system 32 and the water injection port(s) 22. The waste separation system 32 is configured to receive the electrolyte 20 and the aluminum hydroxide waste 26 from the electrochemical cell 10, e.g., at periodic times or when the electrolyte 20 is determined to have sufficient waste build up. The waste separation system 32 then separates the waste 26 from the electrolyte 20, and provides the cleaned up electrolyte 20 to the fuel injector 28. The fuel injector 38 receives the electrolyte 20 from the waste separation system 32 and receives water from a water supply 30, e.g., an external supply such as seawater. If the electrochemical cell 10 includes a water supply 30 that is internal to the cell 10, then the fuel injector 38 provides the electrolyte 20 to the cell 10, which is then combined with the water from the internal water supply 30.

Figure 7:
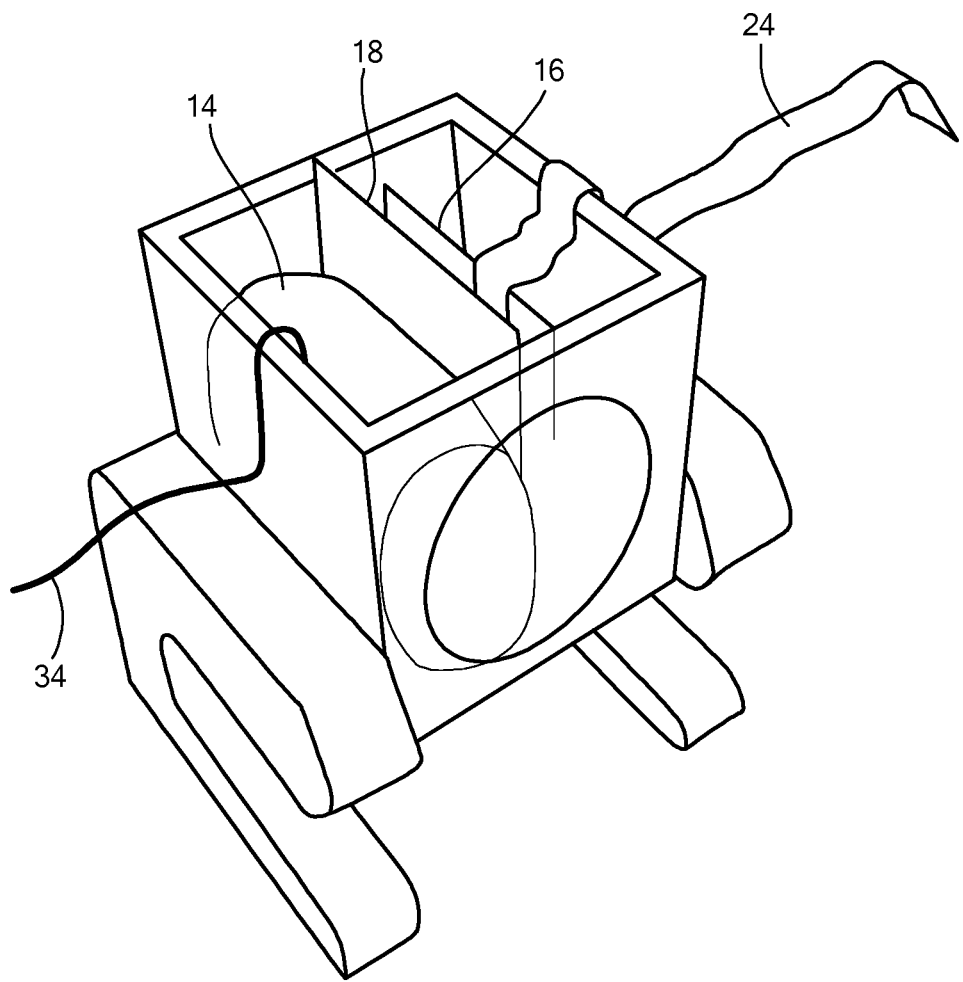
FIG. 7 schematically shows an aluminum-water electrochemical cell with a single electrode stack according to embodiments of the present invention.
Figure 8:
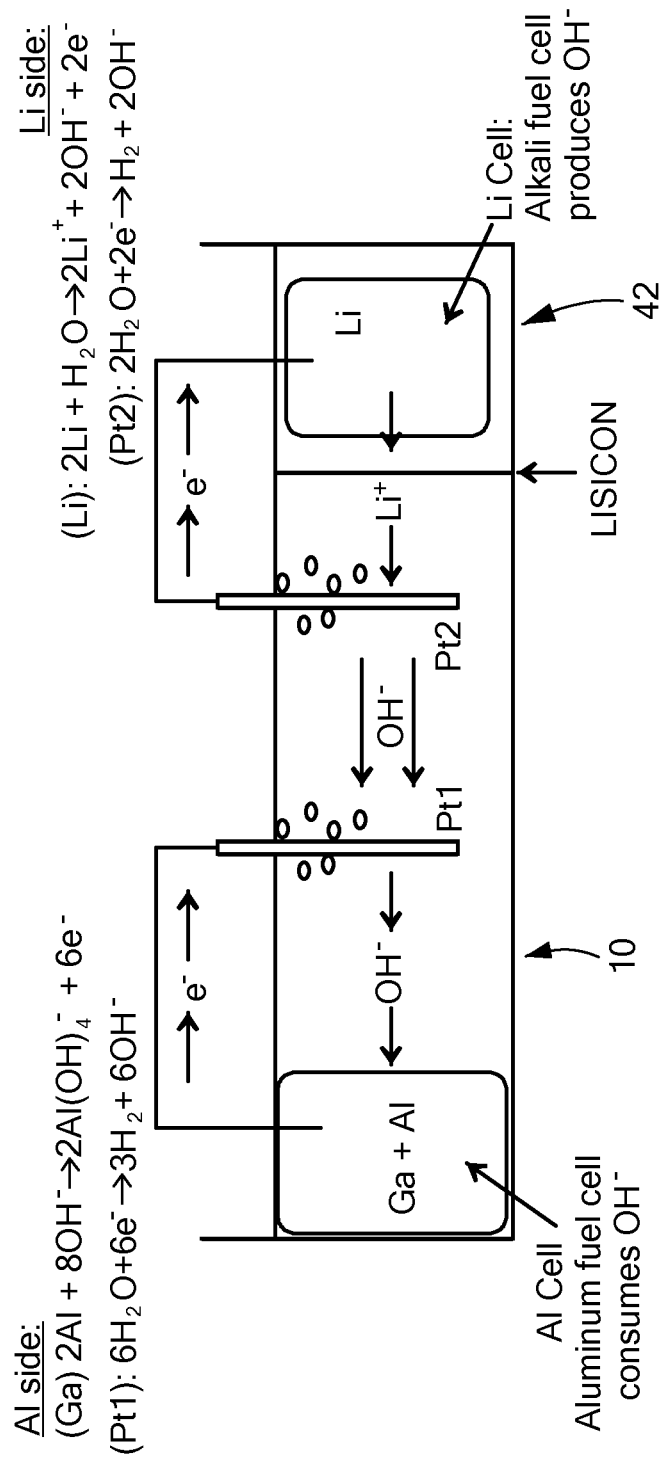
FIG. 8 schematically shows an aluminum-water electrochemical cell with a second metal electrochemical cell according to embodiments of the present invention.

Although the electrochemical cell 10 discussed above includes a number of electrode stacks 12 with anodes 14 and cathodes 16, a single stack 12 may also be used, such as shown in FIG. 7. In addition, a second metal electrochemical cell 42, such as a Li—$H_2O$ cell 42, may be used in conjunction with the aluminum-water electrochemical cell 10 discussed above, such as shown in FIG. 8.

EXAMPLES

To further illustrate embodiments of the present invention, the following non-limiting Examples are provided.

Example 1: Electrochemical Al—$H_2O$ Reactor in Acidic Electrolyte

Figure 9:
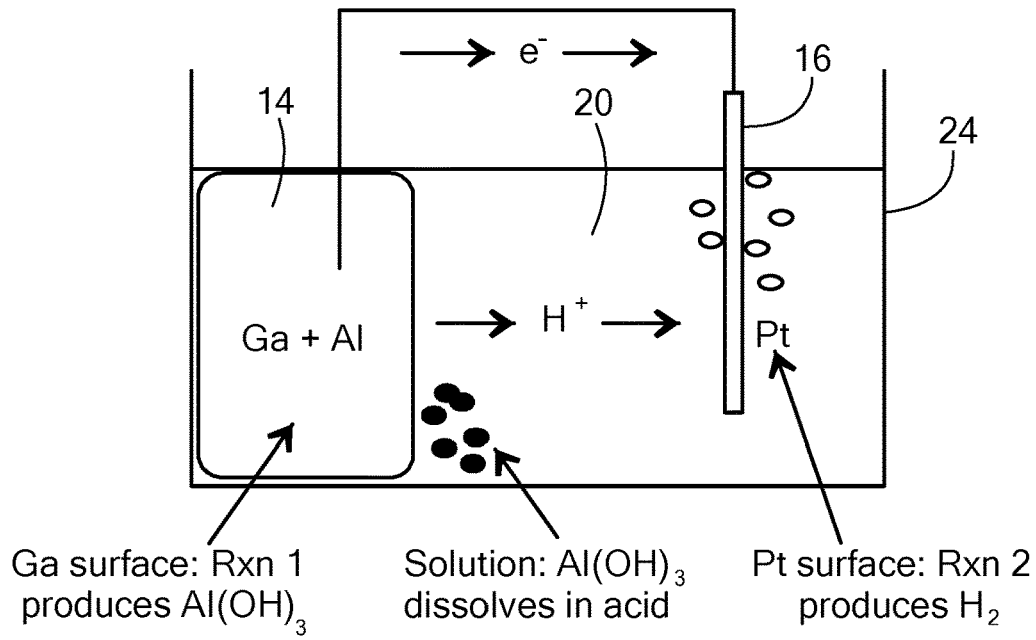
FIG. 9 shows an aluminum-water electrochemical cell configuration with an acidic electrolyte according to embodiments of the present invention.

An acidic cell was created in 30 mM HCl electrolyte with a Pt coated cathode, as shown in FIG. 9. Voltages ranging from 0.8 to 1.5 V were produced between the electrodes, with 95% of $H_2$ production occurring on the Pt cathode, rather than the Al—Ga anode surface. The cell was operated at room temperature. While the exact half-cell reactions in this system are not known exactly, the following hypothetical pathway is consistent with observations to date:

| | | |
|---|---|---|
| Rxn 1 (Al + Ga anode): | $2Al + 6H_2O \rightarrow 2Al(OH)_3 + 6H^+ + 6e^-$ | $E = -1.49$ V |
| Rxn 1.5 (HCl solution): | $Al(OH)_3 + 3H^+ \rightarrow Al^{3+} + 3H_2O$ | $E = 0$ |
| Rxn 2 (Pt cathode): | $3H^+ + 3e^- \rightarrow 1.5H_2$ | $E = 0$ |

Example 2: Electrochemical Al—$H_2O$ Reactor in Alkaline Electrolyte

Figure 10:
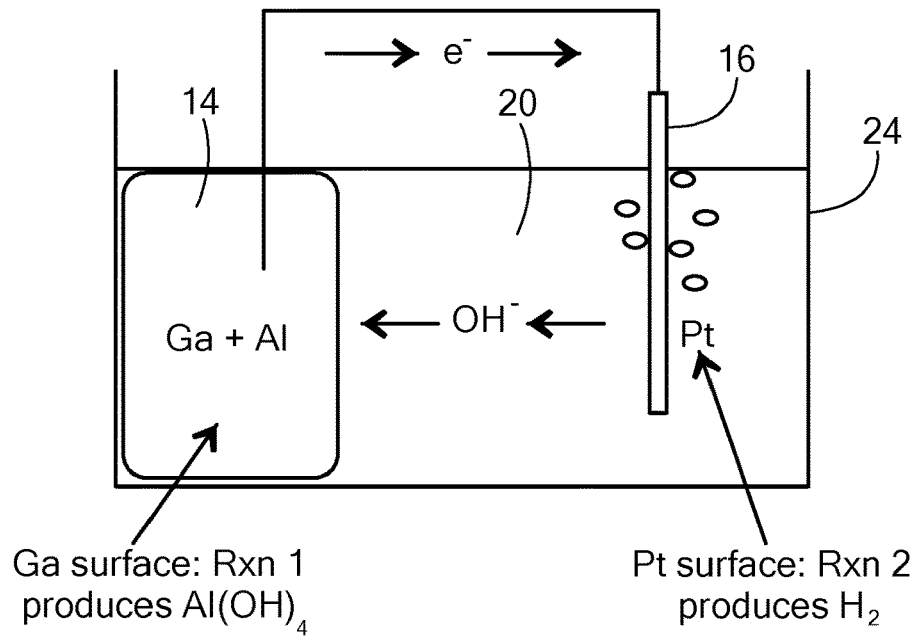
FIG. 10 shows an aluminum-water electrochemical cell configuration with an alkaline electrolyte according to embodiments of the present invention.
Figure 11A:
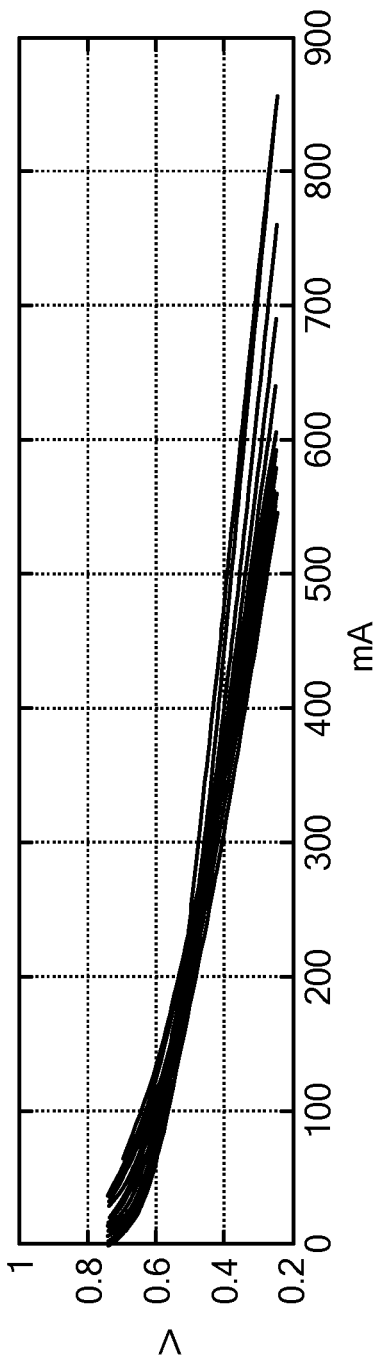
FIGS. 11A and 11B show performance curves for the cell shown in FIG. 1 according to embodiments of the present invention.
Figure 11B:
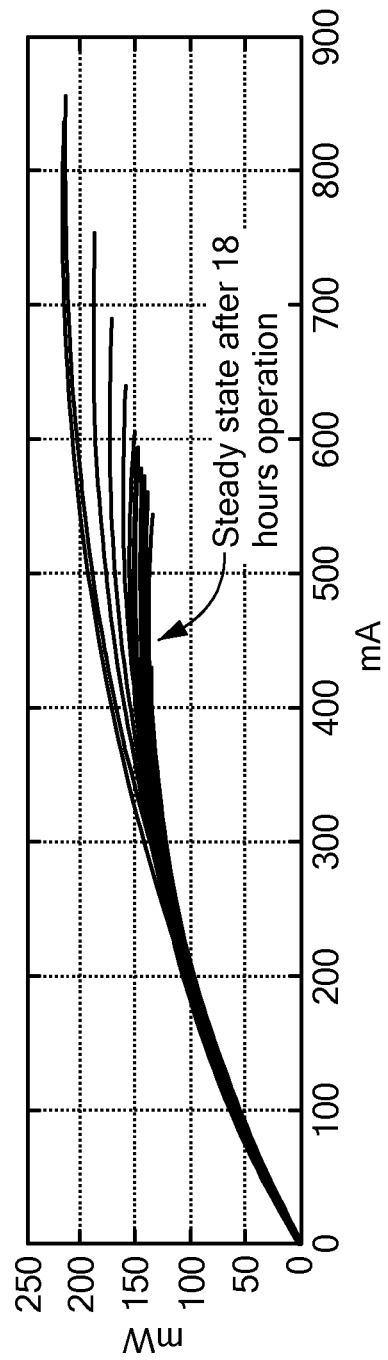

An electrochemical cell was constructed using an Al—Ga anode and Pt coated cathode with a 0.5M NaOH electrolyte, as shown in FIG. 10. This cell produced 1.6V with approximately 90% $H_2$ production on the Pt cathode. The cell was also observed to produce 300 mW through a 5-Ohm resistor for an efficiency of ~65%. The cell was operated at room temperature. The following pathway is confirmed by the XRD data of an electrolyte precipitate and is consistent with the observed open circuit voltage, the absence of solid hydroxide precipitate, and the steady decrease in electrolyte pH:

| | | |
|---|---|---|
| Rxn 1 (Al + Ga anode): | $2Al + 8OH^- \rightarrow 2Al(OH)_4^- + 6e^-$ | $E = -2.33$ V |
| Rxn 2 (Pt cathode): | $6H_2O + 6e^- \rightarrow 3H_2 + 6OH^-$ | $E = -.82$ V |

Example 3: Various Electrolyte Compositions

Electrochemical cells were constructed using an Al—Ga anode and Pt cathode with various electrolyte mixtures. The following performance metrics were measured for the electrolyte mixtures:

TABLE 1

| Electrolyte | $I_{Corr}/I_{SC}$ | $V_{OC}$ (V) | $I_{SC}$ (mA/cm$^2$) |
|---|---|---|---|
| 5M HCl ($H_2O$) | .7 | 1.21-1.6 | 140 |
| 5M NaOH ($H_2O$) | .6 | 1.21-1.55 | 94 |

TABLE 1-continued

| Electrolyte | $I_{Corr}/I_{SC}$ | $V_{OC}$ (V) | $I_{SC}$ (mA/cm$^2$) |
|---|---|---|---|
| .5M KOH (EtOH) | .02 | 1.51 | .4 |
| 5M KOH (MeOH) | .01 | 1.1-1.55 | 12 |
| KOH (BMIM-Tf$_2$N) | 0 | 1.72 | .002 |
| AlCl$_3$ (BMIM-PF$_6$) | 0 | 0.9 | .4 |

In Table 1, $I_{SC}$ is the short-circuit current, $V_{OC}$ is the open-circuit voltage, and $I_{corr}$ is the corrosion current.

Example 4: Small Reactor Cell (44 mm$^3$)

An electrochemical cell was constructed using $Al_{99.7}Ga_{0.15}In_{0.15}$ anodes and platinized titanium cathodes with an 0.5M KOH in $H_2O_{40}$Methanol$_{20}$Acetonitrile$_{40}$ electrolyte, as shown in FIG. 1. This cell produced about 1.9 W/L power density, 3.7 MJ/L (@1.2 W/L) energy density, and had a neutral buoyancy of about 1.2 g/cm$^3$. FIGS. 9A and 9B show the performance curves for the cell that was run for about 30 hours.

Example 5: Large Reactor Cell (330 ml Cylinder)

An electrochemical cell was constructed using Al anodes and Ni (Ni electroplated on carbon) cathodes with a 1M KOH (aq) electrolyte, as shown in FIG. 6. This cell produced about 6 W/L power density and 5 MJ/L (@1.2 W/L) energy density. FIGS. 10A and 10B show the performance curves for the cell that was run for about 30 hours.

Example 6: Alkaline Aqueous Electrolytes

An electrochemical cell was constructed with $Al_{0.998}Sn_{0.001}Mg_{0.001}$ anodes, Ni (Ni electroplated on carbon) cathodes, and an alkaline aqueous electrolyte at a number of KOH concentrations. For each KOH concentration, the power density of the cell was measured at different voltages and the measurements were plotted in FIG. 13, revealing an increase in performance directly proportional to the electrolyte KOH concentration. This observation is consistent with the cell generating current by the electrochemical pathway described above in Example 2, where higher hydroxide base concentrations facilitate the transport of hydroxide ions and removal of spent reactants while preventing or reducing reaction of water directly with the aluminum fuel in the anode, thereby increasing the power output and reducing the corrosion rate of the fuel cell.

Figure 13:
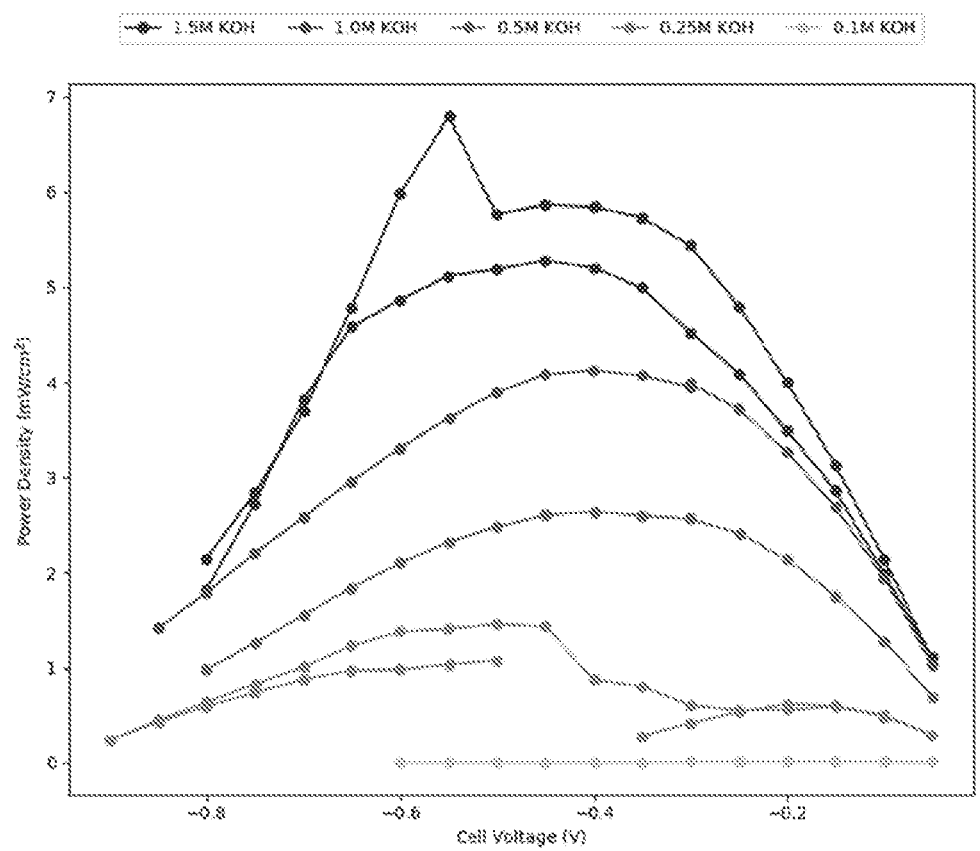
FIG. 13 shows performance curves for an aluminum-water cell with an alkaline electrolyte at different KOH concentrations.
Figure 14:
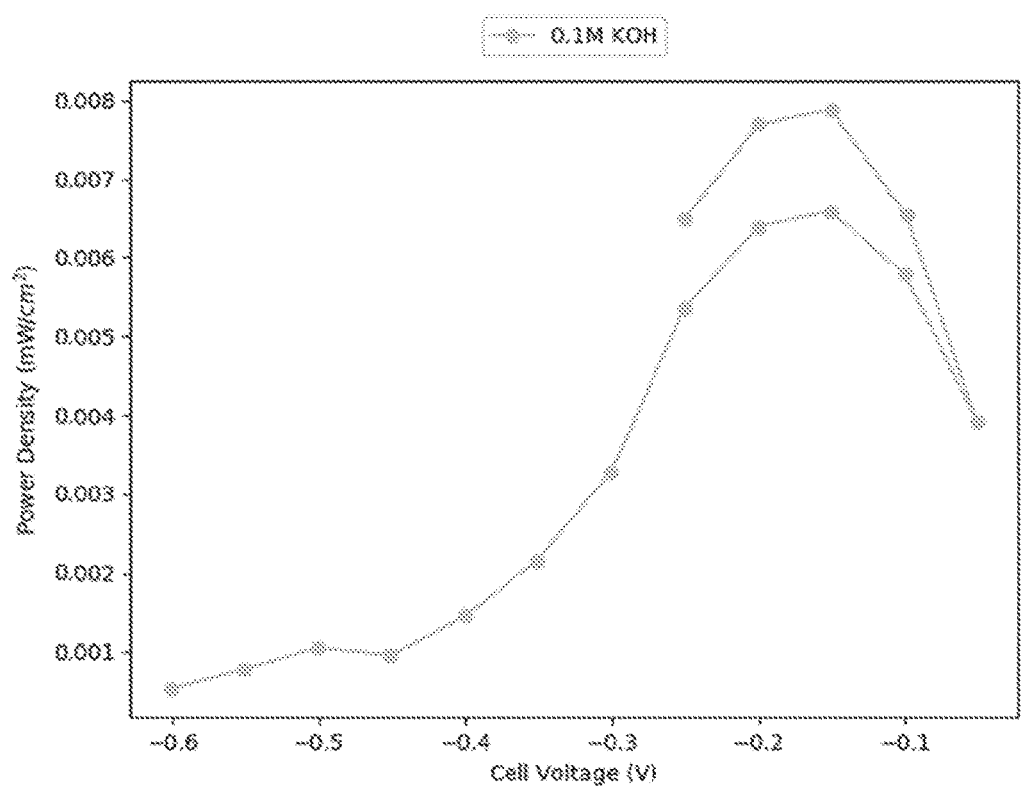
FIG. 14 is the performance curve for KOH at a concentration of 0.1 M from FIG. 13, re-plotted at a higher resolution.

As illustrated FIG. 14, which is a plot of the measurements obtained with KOH 0.1 M at a higher resolution than in FIG. 13, a beneficial effect was already measurable at relatively lower alkali concentrations, while the results reported in Example 3 above show that such effects are obtainable with hydroxide bases at concentrations of 5 M and higher.

Example 7: Iron Impurities

A number of electrochemical cells were constructed using Al anodes and Ni (Ni electroplated on carbon) cathodes with a 1M KOH (aq) electrolyte. Each electrode had a surface of 1 cm$^2$ and the electrolyte had a volume of 5 mL. Different anode formulations were tested by alloying the anodic Al with different amounts of Fe, Si, Mg, and Sn. The coulombic efficiency of each cell was measured at the temperatures of 10° C. and 30° C., respectively. The composition of each anode and the measured coulombic efficiencies are reported in Table 2:

TABLE 2

| Alloy | Fe wt % | Si wt % | Mg wt % | Sn wt % | Al | 10° C. mA/cm$^2$ | Coul eff. | 30° C. mA/cm$^2$ | Coul eff. |
|---|---|---|---|---|---|---|---|---|---|
| 1 | 0.0005 | 0.0022 | 0.11 | 0.073 | 5N | 16 | 0.98 | 42 | 0.99 |
| 2 | 0.0008 | 0.0014 | 0.105 | 0.073 | 4N6 | 7 | 0.98 | 22 | 0.84 |
| 3 | 0.0042 | 0.0044 | 0.108 | 0.073 | 4N | 7 | 0.98 | 20 | 0.82 |
| 4 | 0.0218 | 0.0219 | 0.11 | 0.073 | 3N6 | 7 | 0.97 | 22 | 0.82 |

In Table 2, the amount of each impurity is measured in wt %, and the coulombic efficiency is measured following discharge at the current densities reported in the table. It can be seen that the coulombic efficiencies depend on the purity of the Al used and that alloys where the aluminum is at least 99.95 wt % pure tend to yield better results. It is also noteworthy that increases in the Fe content of the anode lead to marked losses in coulombic efficiency, especially at 30° C. Such losses were less apparent at 10° C., likely because corrosion reactions proceed at lower rates when the temperature is lowered.

Example 8: Titanium and Boron Impurities

A first electrochemical cell was constructed using an Al alloy (Alloy 1066) anode and a Ni (Ni electroplated on carbon) cathode with a 1M KOH (aq) electrolyte. Each electrode had a surface of 1 cm$^2$ and the electrolyte had a volume of 5 mL. The anodic alloy cell included 99.83 wt % Al (from Al 5N, 99.999 wt % purity), 0.1 wt % Mg, and 0.07 wt % Sn. A second cell was constructed with an anode featuring the same alloy as the first cell but with TiB$_2$ added in the amount of 0.01 wt %. The cells were tested with a Biologic SP-50 potentiostat (Bio-Logic, France) using a linear voltage sweep technique. Both electrode voltages were monitored vs. a Hg/HgO reference electrode.

Figure 15:
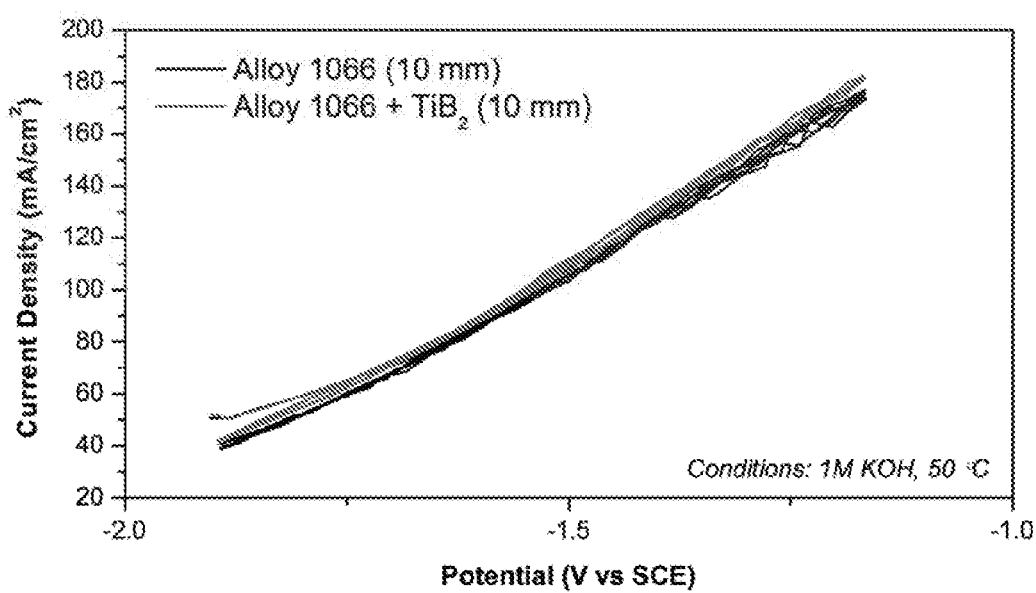
FIG. 15 shows current density-potential curves comparing the performance of a pure aluminum anode to that of an anode containing certain impurities.
Figure 16:
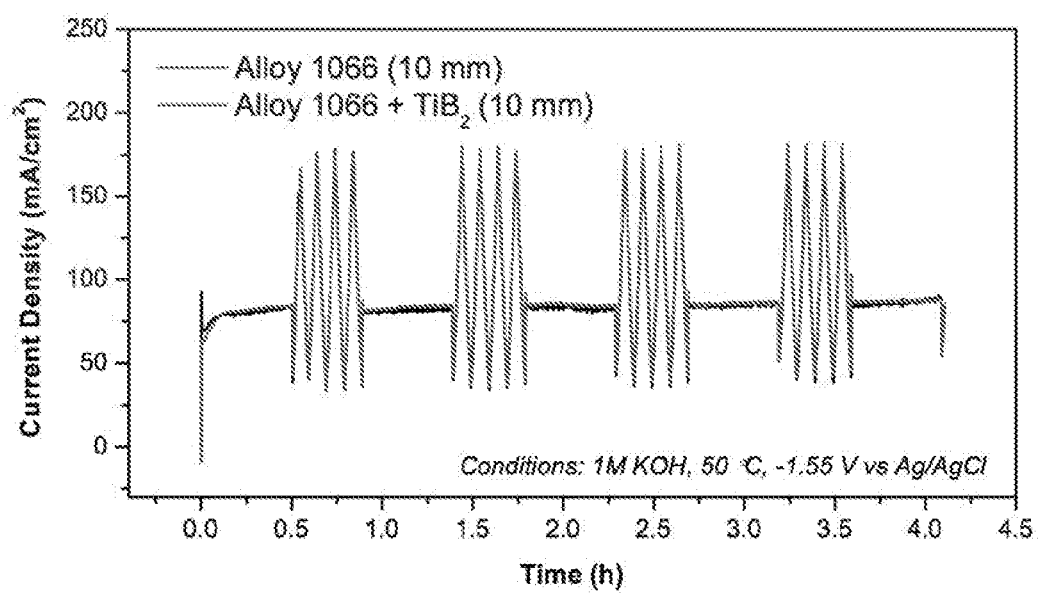
FIG. 16 shows current density-time curves were potential curves comparing the performance of a pure aluminum anode to that of an anode containing certain impurities.

Current density-potential curves were calculated and plotted in the graph shown in FIG. 15. Current density-time curves were also calculated and plotted in the graph shown in FIG. 16. As seen in FIGS. 15 and 16, there is no benefit to, and some detriment from, the addition of Ti and B to the aluminum alloy of the anode.

Although the above discussion discloses various exemplary embodiments of the invention, it should be apparent that those skilled in the art can make various modifications that will achieve some of the advantages of these embodiments without departing from the true scope of the invention.

The invention claimed is:

1. An anaerobic aluminum-water electrochemical cell comprising:
   a plurality of electrode stacks, each electrode stack comprising an aluminum alloy anode, in the form of a plate, the plate having a first side and a second side opposite to the first side, and at least one cathode disposed adjacent to the first side of the plate and at least one cathode disposed adjacent to the second side of the plate, wherein the cathode on the first side and the cathode on the second side are configured to be electrically coupled to the anode, wherein the aluminum alloy is alloyed with two or more metals chosen from a group consisting of Ga, In, Sn, Mg, and combinations thereof;
   one or more water permeable physical separators, between adjacent electrode stacks, positioned between the cathode on the first side of one electrode stack and the cathode on the second side of the adjacent electrode stack;
   an electrolyte disposed between the anode and the at least one cathode on the first side and between the anode and the at least one cathode on the second side in each electrode stack;
   a housing configured to hold the electrode stacks, the electrolyte, and the one or more physical separators; and
   a water injection port, in the housing, configured to introduce water into the housing.

2. The electrochemical cell according to claim 1, wherein the at least one cathode has a surface having an electrochemical roughness factor of at least 5.

3. The electrochemical cell according to claim 1, wherein the at least one cathode has a surface having an electrochemical roughness factor of at least 10.

4. The electrochemical cell according to claim 1, wherein the at least one cathode has a surface having an electrochemical roughness factor of at least 15.

5. The electrochemical cell according to claim 1, wherein the at least one cathode is in the form of a solid plate.

6. The electrochemical cell according to claim 1, wherein the one or more physical separators are formed from a mesh material having openings of about 100 μm or larger.

7. An aluminum-water electrochemical system comprising:
   an aluminum-water electrochemical cell according to claim 1;
   a waste separation system in fluid communication with the housing and configured to receive the electrolyte and aluminum hydroxide waste from the aluminum-water electrochemical cell and to separate the aluminum hydroxide waste from the electrolyte; and
   a fuel injector, in fluid communication with the waste separation system and the water injection port, configured to receive the electrolyte from the waste separation system and to provide the electrolyte to the water injection port.

8. The electrochemical system according to claim 7, wherein the fuel injector is further configured to receive the water from a water supply.

9. The electrochemical system according to claim 7, wherein the electrolyte includes an aqueous electrolyte.

10. The electrochemical system according to claim 9, wherein the electrolyte includes water and sodium chloride.

11. The electrochemical system according to claim 7, wherein the water injection port is configured to introduce the water into the housing so that the water flows through the physical separators.

12. A method for generating an electrical current using an electrochemical cell, the electrochemical cell comprising:
- a plurality of electrode stacks, each electrode stack comprising an aluminum alloy anode, in the form of a plate, the plate having a first side and a second side opposite to the first side, and at least one cathode disposed adjacent to the first side of the plate and at least one cathode disposed adjacent to the second side of the plate, wherein the cathode on the first side and the cathode on the second side are configured to be electrically coupled to the anode, wherein the aluminum alloy is alloyed with two or more metals chosen from a group consisting of Ga, In, Sn, Mg, and combinations thereof;
- one or more water-permeable physical separators between adjacent electrode stacks, positioned between the cathode on the first side of one electrode stack and the cathode on the second side of the adjacent electrode stack;
- a housing configured to hold the electrode stacks, an electrolyte, and the physical separators; and
- a water injection port, in the housing, configured to introduce water into the housing, so that the water flows through the physical separators, the method comprising:
- introducing the water between the anode and the at least one cathode on the first side and between the anode and the at least one cathode on the second side in each electrode stack, the water forming the electrolyte;
- anaerobically oxidizing the aluminum alloy anode; and
- electrochemically reducing the water at the at least one cathode.

13. The method according to claim 12, wherein the at least one cathode has a surface having an electrochemical roughness factor of at least 5.

14. The method according to claim 12, wherein the at least one cathode has a surface having an electrochemical roughness factor of at least 10.

15. The method according to claim 12, wherein the at least one cathode has a surface having an electrochemical roughness factor of at least 15.

16. The electrochemical cell according to claim 1, wherein the aluminum alloy of the anode is substantially free of titanium and boron.

17. The method according to claim 12, wherein the aluminum alloy of the anode is substantially free of titanium and boron.

18. An anaerobic aluminum-water electrochemical cell comprising:
- a plurality of electrode stacks, each electrode stack comprising an aluminum alloy anode, in the form of a plate, the plate having a first side and a second side opposite to the first side, and at least one cathode disposed adjacent to the first side of the plate and at least one cathode disposed adjacent to the second side of the plate, wherein the cathode on the first side and the cathode on the second side are configured to be electrically coupled to the anode, wherein the anode is at least 99.8% aluminum, and the aluminum alloy is alloyed with one or more metals chosen from a group consisting of Ga, In, Sn, and combinations thereof;
- one or more water permeable physical separators, between adjacent electrode stacks, positioned between the cathode on the first side of one electrode stack and the cathode on the second side of the adjacent electrode stack;
- an electrolyte disposed between the anode and the at least one cathode on the first side and between the anode and the at least one cathode on the second side in each electrode stack;
- a housing configured to hold the electrode stacks, the electrolyte, and the one or more physical separators; and
- a water injection port, in the housing, configured to introduce water into the housing.

* * * * *